United States Patent [19]

Lerner

[11] Patent Number: 4,642,767

[45] Date of Patent: Feb. 10, 1987

[54] BOOKKEEPING AND ACCOUNTING SYSTEM

[76] Inventor: Moisey Lerner, 75 Rolling La., Needham, Mass. 02192

[21] Appl. No.: 602,941

[22] Filed: Apr. 23, 1984

[51] Int. Cl.$^4$ ............................................. G06F 15/30
[52] U.S. Cl. ...................................... 364/406; 364/401
[58] Field of Search ......................... 364/401, 406, 408

[56] References Cited

U.S. PATENT DOCUMENTS

| | | | |
|---|---|---|---|
| 3,040,984 | 6/1962 | Cox | 364/406 |
| 3,348,215 | 10/1967 | Soule | 364/406 |
| 3,406,281 | 10/1968 | Buchanan | 364/401 |
| 3,610,902 | 10/1971 | Rahenkamp | 364/406 |
| 3,749,892 | 7/1973 | Stenning | 364/401 |
| 4,114,026 | 9/1978 | Fiorenza | 364/406 |
| 4,192,006 | 3/1980 | Hausdorff | 364/408 |
| 4,264,808 | 4/1981 | Owens | 364/406 |
| 4,277,837 | 7/1981 | Stuckert | 364/408 |
| 4,346,442 | 8/1982 | Musmanno | 364/406 |
| 4,376,978 | 3/1983 | Musmanno | 364/408 |
| 4,435,769 | 3/1984 | Nayano | 364/406 |

FOREIGN PATENT DOCUMENTS 2048530 12/1980 United Kingdom ............... 364/406

Primary Examiner—Jerry Smith
Assistant Examiner—G. Hayes
Attorney, Agent, or Firm—Tomin Corp.

[57] ABSTRACT

Data processing for an improved bookkeeping and accounting system supervises, implements and coordinates a collection of coded data, the number of which is fixed and does not exceed several dozens; which represent totals of accounts describing financial condition of a business; and which are distinguished by the feature that the total of all asset accounts are equal to the total of all equity accounts. Attributes of checks and invoices reflecting new business transactions are entered into the system and each document affects the collection according to the change of financial condition in such a way that the asset-equity equation is always kept in balance. Statement of financial condition and income statement are formed based on the last updated collection of coded data and on a comparison of the last and the reference collections. The attributes of documents of business transaction after having been processed are arranged to form a database for a subsequent updating of accounting journals. The system is distinguished by a small operating memory which may be less than 16 kilobytes and therefore can be based on inexpensive computers. The system is also distinguished by an immediate magnetic tape backup of processed information.

6 Claims, 7 Drawing Figures

BOOKKEEPING AND ACCOUNTING SYSTEM

DISCLOSURE OF THE INVENTION

The invention relates to financial business systems and, more specifically, to data processing methodology and apparatus for effecting an improved bookkeeping and accounting system.

It is an object of the present invention to provide an improved bookkeeping and accounting system.

More specifically it is an object of this invention to provide a data-processing implementation for a bookkeeping and accounting system which provides for automatic changes in the monetary totals of accounts and in the statement of financial condition (balance sheet) whenever a new document of business transaction is entered into the machine; which compares the totals of accounts at any two days, one earlier, the other later, in order to generate income statement for the period between these two days; which provides a printed report of financial statements and of documents of business transactions for verification immediately after these documents have been entered into the machine; which arranges attributes of a document of business transaction into a collection of coded data, these collections creating a database to be used for updating accounting journals; which provides a multi-level backup of initial and derived financial information for verification and easy restoring in case a portion of this information is incidentally lost; which does not require special bookkeeping or accounting skills to operate the machine.

The above and other objects of the present invention are realized in a specific illustrative low price bookkeeping and accounting system referred to hereinafter as a "machine", based on a 16 kilobyte Sinclair computer (model ZX81) with a ZX99 tape control system, designed and manufactured by Sinclair Research Company in the United Kingdom.

According to the invention, the bookkeeping and accounting system has an input device to receive a collection of coded data, each of these data representing a monetary total of account. This collection satisfies the following two requirements:

(a) all data describe financial condition of a business as of a particular day;

(b) all data of the collection are balanced in the way that the total of all asset accounts is equal to the total of all equity accounts.

Ordinarily, totals of about 30 accounts are needed to describe financial condition of a business. Each account is described by its monetary total and by a code. The code may be numerical or letter or both. The position of an account in the collection may also be used as a code, e.g., the 20th amount by order may be chosen as an account having code 20.

A collection of coded data as of a particular day we will refer to as a "file". We will call the file "initial" (another name "parent") if it is expected to be updated to provide an "updated file" (another name "daughter file"). Said particular day we will call "starting day" for the initial file or "ending day" for the updated file. According to the invention the machine has a processing unit which memorizes the initial collection after it has been entered through the input device. Another input device, like a keyboard, is used to enter the code and monetary amount of a document describing business transaction which has not yet been reflected in the initial collection. Ordinarily, this document of business transaction is either this business' check or a check from others, its own invoice or an invoice from others. According to the invention the processing unit has an algorithm which adds (subtracts) the entered amount to (from) the total of one business account and to (from) the total of a second corresponding business account so that the accounting equation "total assets=total equities" remains balanced. As a result of this addition (subtraction) a new collection of coded data is created which is essentially the above mentioned "updated collection" or "updated file". The updated collection is arranged with the help of an algorithm of the processing unit to become a statement of financial condition (another name: balance sheet) on the day of entering the new data. Said balance sheet is then printed out. The processing unit has also an algorithm for storing the updated collection on magnetic tape and also on other available information storage means, like floppy disk, bubble memory, etc. After at least one new business transaction has taken place, the stored updated collection becomes an initial collection to be updated.

In order to generate income statements, the processing unit of the machine has an algorithm which subtracts the initial collection of coded data from the updated collection, whereby a new differential collection is created. The differential collection of coded data reflects changes caused by entering new documents of business transactions. The processing unit has another algorithm for combining and arranging numerical data of differential collection to generate income statement for the period from starting day to ending day. The machine also has an output device providing a printout of this income statement. The processing unit of the invented machine is also capable of memorizing entered attributes of a document of business transaction. These attributes, like date, number, issuer name, etc., along with code and monetary amount are arranged with the help of the processing unit into a collection of coded data. This collection is stored in a memory device to create a database for a subsequent updating of accounting journals, like sales journal, cash receipt journal, etc.

The foregoing and additional features and advantages of this invention will become more readily understood from the following detailed description of illustrative embodiment thereof taken in conjunction with the accompanying drawings in which.

Figure 1:
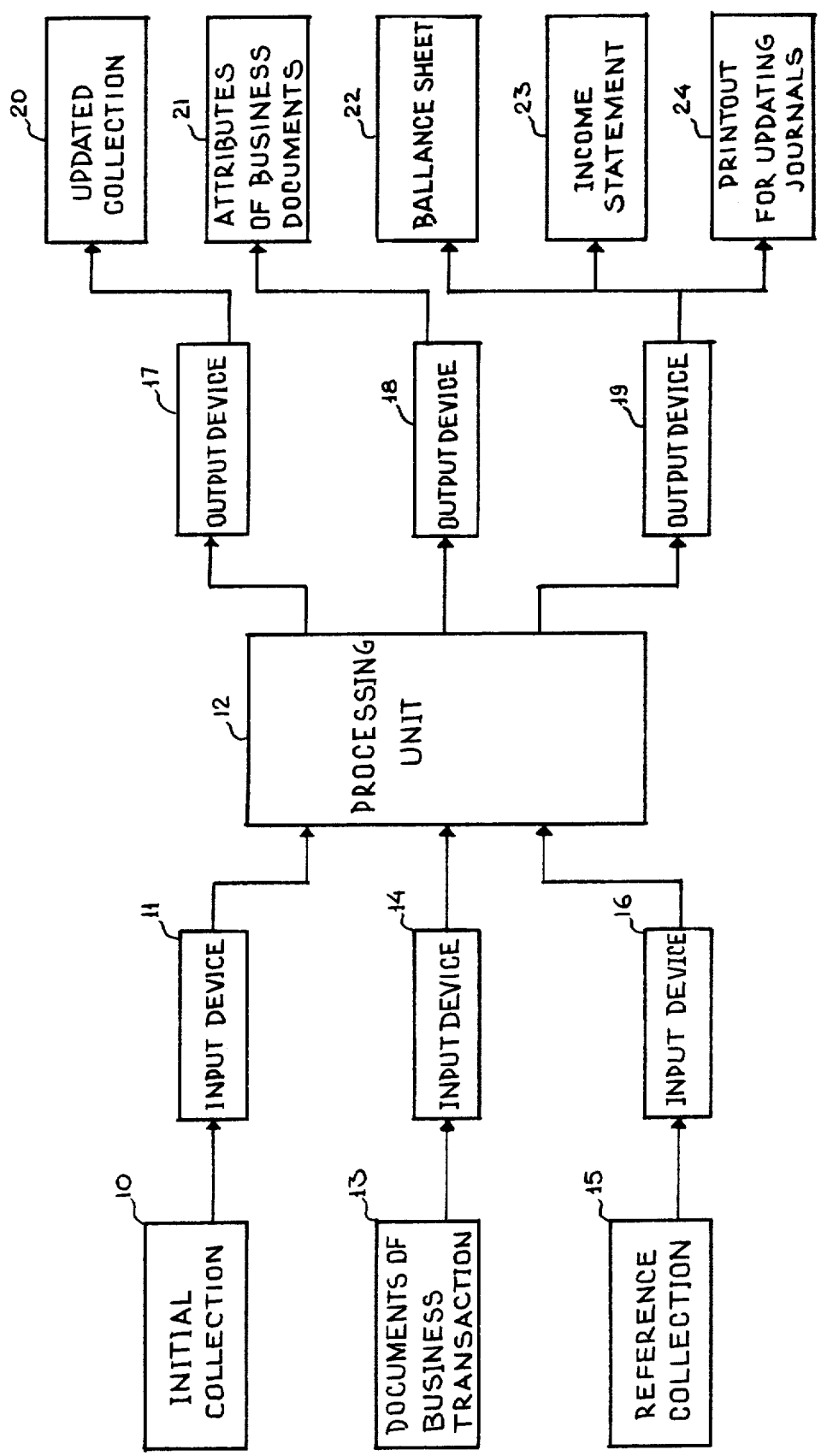
FIG. 1 is a schematic block diagram which represents the invented method and the machine for generating financial statements.

Referring now to FIG. 1, there is shown an illustration of one of the principles of the invention. A collection of coded data 10, reflecting totals of accounts, said collection being stored on magnetic tape and also on other available information storage means is entered into the processing unit 12 with the help of one of the input devices 11. The input device may be a tape recorder, or a disk drive or other information storage means. The collection of coded data may be like the following one:

| 250 | 80.75 | 0 | 21.5 |
|---|---|---|---|
| 34 | 170 | 3.4 | 42.95 |
| 14 | 3.15 | 360.65 | 114.8 |
| 40 | 21.95 | 43.5 | 53.6 |
| 124.3 | 102 | 146.7 | 63.8 |
| 150 | 10819 | 196.4 | 1864.55 |
| 49 | 11369 | 1000 | 2303 |
| 07 | 31 | 83 | |

Each datum of the first 28 data of this collection represents the monetary total of an account. For instance, the first datum 250 of the collection should be interpreted as $250 total of the account having code 1 which is the rent account in this illustration. This collection has the first 28 data satisfying the following two requirements:

(a) the collection reflects all asset and all equity accounts of a business as of a particular date (here the date is July 31, 1983 as indicated by the last three data of the collection);

(b) all 28 numbers representing monetary totals of the accounts are balanced in such a way that the total of all asset accounts is equal to the total of all equity accounts. In this collection the 21st to 24th amounts represent totals of asset accounts, and more particularly the 21st amount is a total of accounts receivable, 22nd—fixed property account, 23rd—inventory account, 24th—cash account. The 25th to 28th amounts represent equity accounts, and more particularly the 25th and 26th amounts are totals of short and long term liability accounts, 27th—capital account, 28th—revenue account. Amounts from the 1st to 20th represent expense accounts.

Although a collection of only 28 data is considered here, it does not mean that the number of business accounts may not exceed 28. Each separate datum may be a total of many accounts. For example, the 11th datum of the collection which is the total of account 11, which is salary, may include salary of employee 1 (having for instance code 111), of employee 2 (code 112), etc. Here the first two characters of the three-character code refer to salary expense account, but the last character refers to the employee number, which can be stored somewhere else, but not necessarily in this collection as it is shown in the flow chart of FIG. 12. In this manner, the collection of only 28 numbers can cover a much larger number of accounts.

In the collection considered above, the total of all asset accounts is equal to $13,029.95. The total of all equity accounts is equal to the same amount, if we take into consideration that totals of expense accounts should be regarded as negative numbers. After a proper arrangement performed by the algorithm of the processing unit, this collection of coded numbers yields the following balance sheet:

| BALANCE SHEET 07/31/83 | |
|---|---|
| ASSETS | |
| CURRENT ASSETS | |
| RECEIVABLES | 150 |
| CASH | 1864.55 |
| INVENTORY | 196.4 |
| TOTAL CURRENT ASSETS | 2210.95 |
| FIXED ASSETS | 10819 |
| TOTAL ASSETS | $13029.95 |
| EQUITIES | |
| CURRENT LIABILITIES | 49 |
| LONG TERM LIABILITIES | 11369 |
| CAPITAL | 1000 |
| OWNER'S EQUITY | 1611.95 |
| TOTAL EQUITIES | $13029.95 |

Since a collection of coded data reflects financial condition of a business on a particular day, which in this example was July 31, 1983, this collection may be called "file of July 31, 1983". Suppose since July 31 a number of business transactions took place causing changes in financial condition. Therefore the file of July 31 becomes the initial file, which should be updated by entering new documents of business transactions. Suppose on Aug. 5, 1983 the business described by the above balance sheet received an invoice #365 for $210 from ABC Company for rent. After processing the invoice, liability account (code 25) would increase by $210 and rent expense account (code 1) would also increase by $210 keeping the accounting equation (assets=equities) in balance. In order to perform these operations the attributes of the invoice (see block 13 in FIG. 1) were entered into the processing unit 12 through one of the input devices 14, like a keyboard, tape recorder, etc. Since the invoice is for rent, a corresponding code of expenses (here code 1) is assigned to the invoice. The processing unit memorizes the monetary amount and the code of the invoice and then adds this amount, to the total of liability account (code 25) and to the total of rent expense accoun (code 1). In this way a new, updated collection of numerical data is created which differs from the initial one by datum having code 1 (it was 250, now it is 460) and by datum having code 25 (it was 49, now it is 259). Any following document of financial transaction can be entered and processed using the same methodology further affecting the initial collection incrementally. If no other document was entered the updated collection (block 20 in FIG. 1) is stored on a magnetic tape and also on any other available information storage means, with the help of output device 17. The data of said updated collection are combined and arranged to form an updated statement of financial condition which is displayed on the screen and printed out with the help of output device 19:

| BALANCE SHEET 08/05/83 | |
|---|---|
| ASSETS | |
| CURRENT ASSETS | |
| RECEIVABLES | 150 |
| CASH | 1864.55 |
| INVENTORY | 196.4 |
| TOTAL CURRENT ASSETS | 2210.95 |
| FIXED ASSETS | 10819 |
| TOTAL ASSETS | $13029.95 |
| EQUITIES | |

-continued

| BALANCE SHEET 08/05/83 | |
|---|---|
| CURRENT LIABILITIES | 259 |
| LONG TERM LIABILITIES | 11369 |
| CAPITAL | 1000 |
| OWNER'S EQUITY | 1401.95 |
| TOTAL EQUITIES | $13029.95 |

This balance sheet reflects financial condition of the business on Aug. 5, 1983 when the document of new business transaction has been entered into the machine. Since each entered document alters financial condition which is therefore described by a new collection of coded data, the number of new collections will be equal to the number of business transactions, but the machine will keep in memory only the initial and the last updated collection. This means that each document affects the coded collection incrementwise rather than accumulating documents which affect the collection bunchwise. Consequently the machine needs very small operating memory, as low as 16 kilobytes or even less though it has the power of processing megabytes of information.

In order to arrive at income statement, the processing unit has an algorithm for subtracting the initial collection of coded data from the updated collection so that each number of unupdated collection having a particular code is subtracted from a corresponding number of updated collection having the same code. In this way a new differential collection of coded data is created which reflects changes which have happened in financial condition of a company caused by business transactions which took place during the period from July 31 to August 5:

| | | | |
|---|---|---|---|
| 210 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 210 | 0 | 0 | 0 |
| 0 | 0 | 0 | 0 |

This collection reflects the only transaction which happened during this period and which resulted in increasing rent expense account and decreasing cash account by $210. The processing unit has another algorithm for rearranging the data of differential collection in order to form the following income statement:

| INCOME STATEMENT FROM 07/31/83 TO 08/05/83 | |
|---|---|
| REVENUE | 0 |
| EXPENSES | |
| RENT | 210 |
| UTILITY | 0 |
| TRAVEL | 0 |
| OFFICE | 0 |
| FEE | 0 |
| TAX | 0 |
| FREIGHT | 0 |
| BUSINESS | 0 |
| MATERIALS | 0 |
| BANK CHARGE | 0 |
| SALARY | 0 |
| AUTO | 0 |
| ADVERTISING | 0 |
| RESEARCH | 0 |
| TELEPHONE | 0 |

-continued

| INCOME STATEMENT FROM 07/31/83 TO 08/05/83 | |
|---|---|
| INVENTORY EXPENSE | 0 |
| EXPENSING | 0 |
| DEPRECIATION | 0 |
| INSURANCE | 0 |
| INTEREST | 0 |
| TOTAL EXPENSES | 210 |
| NET INCOME (LOSS) | −210 |

FIG. 1 illustrates another principle of the present invention. In order to derive an income statement for any arbitrary period two collections of coded data, reflecting financial condition of a business at the beginning and at the end of the period should be entered into the machine. The later collection may be the just updated collection or any other collection. The earlier collection is called "reference collection" and the day of this collection is called "reference day". The reference day may be, for instance, the beginning of fiscal year, or quarter, or month. The reference collection is subtracted from the later collection to form a differential collection, which after rearranging provides an income statement for the period from the reference day to the ending day.

FIG. 1 also illustrates the third principle of the invention, that is providing a database for updating accounting journals after the financial statements have been generated. In order to realize this principle the machine arranges the attributes of a document of financial transactions to form a collection of coded data after said attributes have been entered into the processing unit. For example, in the above described case of invoice #365 of Aug. 5, 1983, the attributes of said invoice have been arranged to form the following coded collection:

| 1 | 4 | 365 | 07 | 05 | 83 | 210 | ABC |
|---|---|---|---|---|---|---|---| where 1 is the code of rent expense account; 4—code of the entered document (here invoice from others); 365—invoice number; 07 05 83—date; 210—monetary amount; ABC—name of the company which issued the invoice. After the collection has been formed it is immediately printed out for verification with the help of output device (block 18 of FIG. 1). The collection is also saved, together with collections of attributes of other documents of business transactions in the operating memory of the processing unit. These collections will create a database to provide printed reports for updating accounting journals after the process of updating the financial condition is over. The size of database depends on the size of available operating memory. Also the size of database should not be so large that it would require an excessive effort in order to restore the database in case it was incidentally lost. Ordinarily, the database remembered by the operating unit should not exceed 20-40 documents of business transactions and for document entering session should not last more than one hour. After the allowable number of entered documents is reached the process of updating closes, the updated file is saved on magnetic tape and also on other available storage information means, the financial statements are printed out, and the information for updating accounting journals is also printed out by output device 19. If more documents of business transactions have to be entered a new process of updating is started. In this way a reliable backup of information is established on magnetic tape saving new collection of coded data after every hour or so of operating the machine.

Referring now to FIG. 2, there is shown in overall scope a data processing and system operational flow chart for implementation of an improved bookkeeping and accounting system incorporating the principles of the present invention. As contemplated by the present invention, any possible business transactions made by a business can be described to a computer with the help of only four documents: checks issued by the business (own check), checks from others, own invoices and invoices from others.

To describe sales, the attributes of own invoice are entered into the machine, adding invoice amount to revenue account in the equity side of accounting equation and to accounts receivable in the asset side of equation (if the accrual method of accounting is implied). When the invoice is paid, accounts receivable diminish by the amount of payment, whereas cash account, which is in the asset part of the equation, accordingly increases so that the equation stays in balance.

The description of purchasing starts by entering invoice from others into the machine, adding the amount to be paid to accounts payable and to appropriate expense account in the equity part of accounting equation, or to inventory or fixed assets account in the asset part of the equation. When invoice from others is paid, cash account and accounts payable both diminish by the same amount. Any other financial transaction, like loan to others or borrowing from others is reflected by issuing own check or depositing check from others immediately affecting cash account and account receivable in case of lending and cash account and accounts payable in case of borrowing.

Figure 2A:
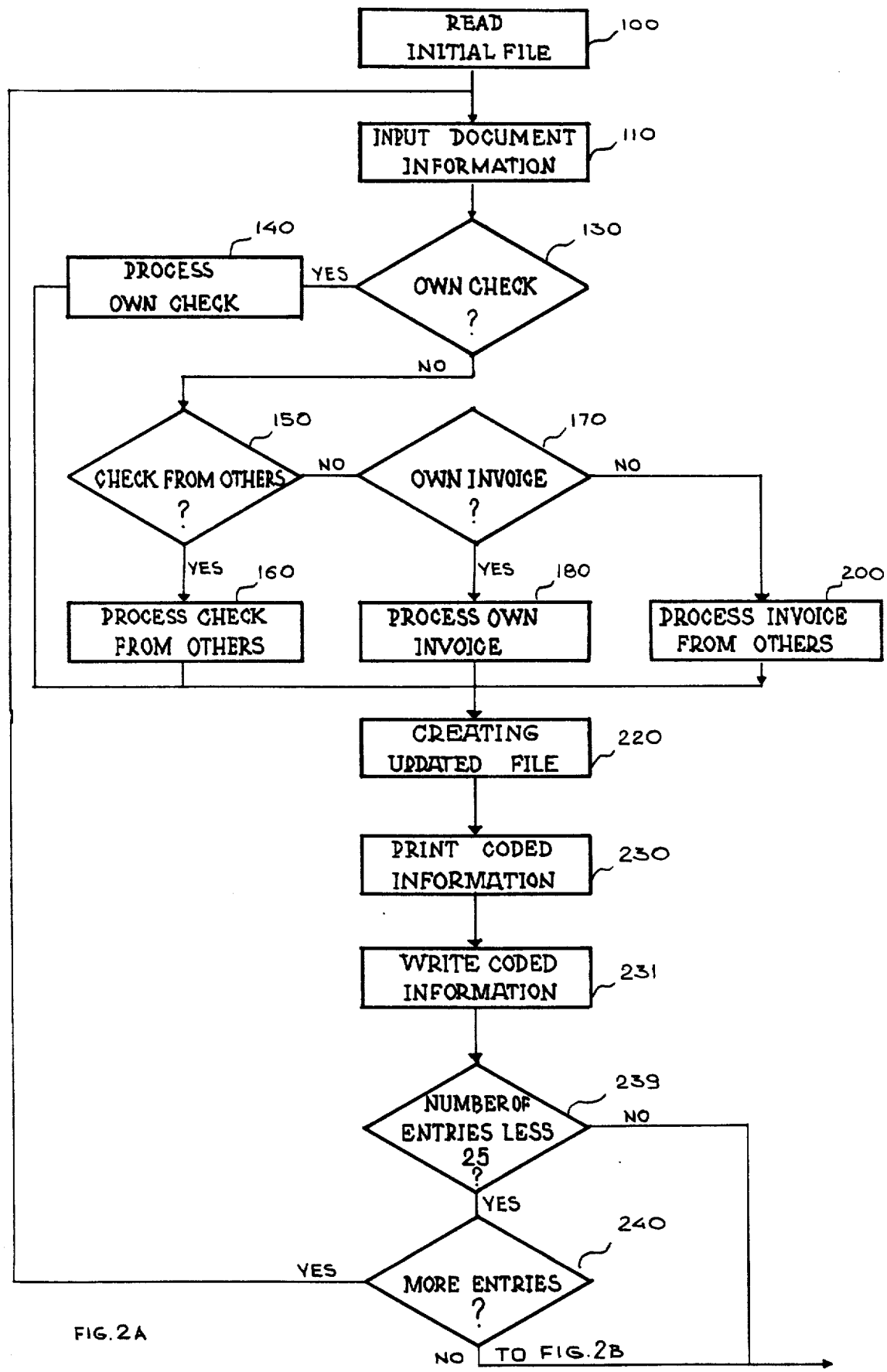
FIGS. 2A and 2B are respectively the upper and lower portions of a schematic flow chart depicting and data processing methodology and structure in accordance with the principles of the present invention for an improved bookkeeping and accounting system.
Figure 2B:
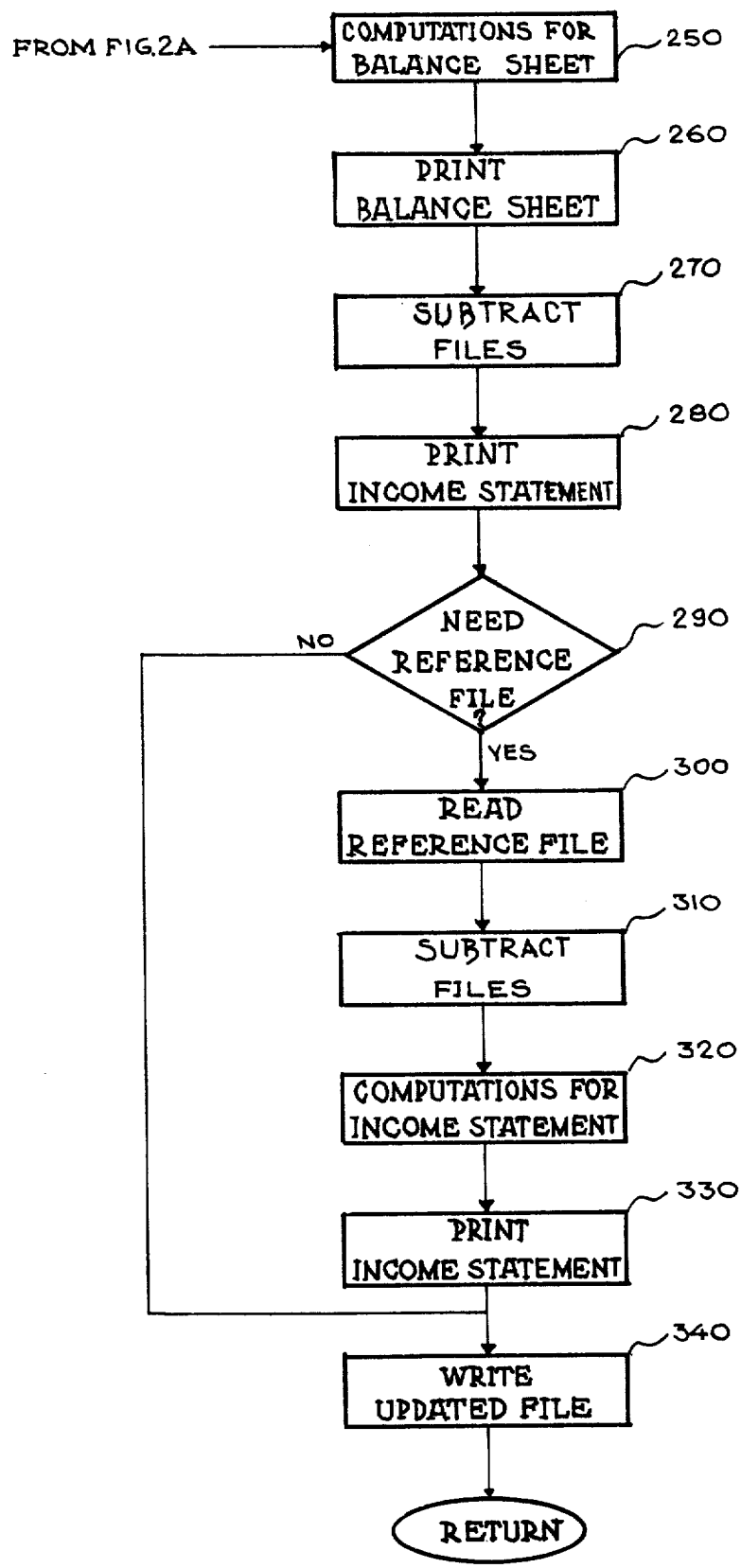

With the above overview in mind, attention will now be directed to FIGS. 2A and 2B herein referred to as composite FIG. 2, which is a schematic flow chart in overall scope of the data processing of the present invention for effecting the above described operations. Beginning at the top of FIG. 2, the collection of coded data describing financial condition of a business is transmitted to the processing unit (functional block 100). Attributes of a document of business transaction to be updated by the machine are entered into the system (functional block 110). The incoming information is verified at functional blocks 130, 150 and 170. This verification assures that the entered document of business transaction belongs to one of the four principal documents: own check (block 130), check from others (block 150), own invoice and invoice from others (block 170). If, for example, verification proved out, that the document of business transaction is the own check of company ("yes" output of "own check" test) the system flow passes to the next following procedure of processing this check. During this procedure the addresses of two accounts which match own check are identified by the processing unit. One account matching the check is always cash account in the asset part of accounting equation. The other account is either accounts receivable if the own check is issued as a loan, or it is liability account if the own check is issued to pay invoice from others. Instead of assigning the address automatically, the code of account can also be inquired and entered into machine. Considering for instance, processing invoice from others (functional block 200) one account, which is liability account, is assigned automatically by the machine. The other account belongs to one of possible expense accounts and therefore the code of this account is inquired and is entered by the operator. After blocks 140, 160, 180, or 200 the information flows to functional block 220 to created an updated file by adding monetary amount of the document of business transaction to each of two totals of the collection of coded data. The codes of these two totals have been previously assigned in blocks 140, 160, 180, or 200.

Following file updating, the attributes of document of business transaction are arranged to form a collection of coded data which is immediately printed out for verification (block 230), removed from the operating memory of the machine and stored (block 231) on magnetic tape and also on any other available information storage means in order to create a database for a subsequent updating of accounting journals like sales journal, cash receipt journals, etc.

The process of updating now is over and if there is no more entries, which is verified by the test "more entries?" (block 240) and/or the number of entries reaches the preset limit (functional block 239) the financial statements are then created during subsequent steps 250 to 330. Maximum numbers of entries in this flow chart is equal to 25. Any other number of entries could be chosen depending on the time period deemed reasonable to spend for re-entering documents in case the records have been incidentally lost during the process of updating or lost in a memory storage device.

In order to create balance sheet some additional data should be derived from the updated file, which is subjected to a number of computations (block 250). After arranging these data to form a balance sheet it is then displayed on the screen and printed out (block 260). Following this step a procedure of block 270 performs subtraction of initial file from updated file in such a way that the total of each account of initial file having a particular code is subtracted from the corresponding total of updated collection having the same code. A new differential file is created and the data of this file are combined (block 280) to be used for a printout of income statement on a screen and as a printed report. Said income statement takes into consideration only those changes which have happened since the last documents of business transactions were entered into the machine. It provides therefore a helpful tool for verifying whether the documents have been entered correctly or not. Whenever it is desired to have another income statement, which covers a longer period, starting from the beginning of month, fiscal year, etc., a reference file describing financial condition on the reference day is read after the test "need reference file?" (block 290) is satisfied ("yes" output). The reference collection of coded data is then subtracted from the updated file (block 310) in the manner similar to that of block 270. The data of the new created differential file are then computed and arranged (block 320) to orm an income statement from the reference day until the ending day (block 330). Following this step the updated collection of coded data is saved by the processing unit on magnetic tape and also on any other available information storage means (functional block 340). If, however, the test 280 fails ("no" output) the step 340 of saving the updated file immediately follows.

Figure 3:
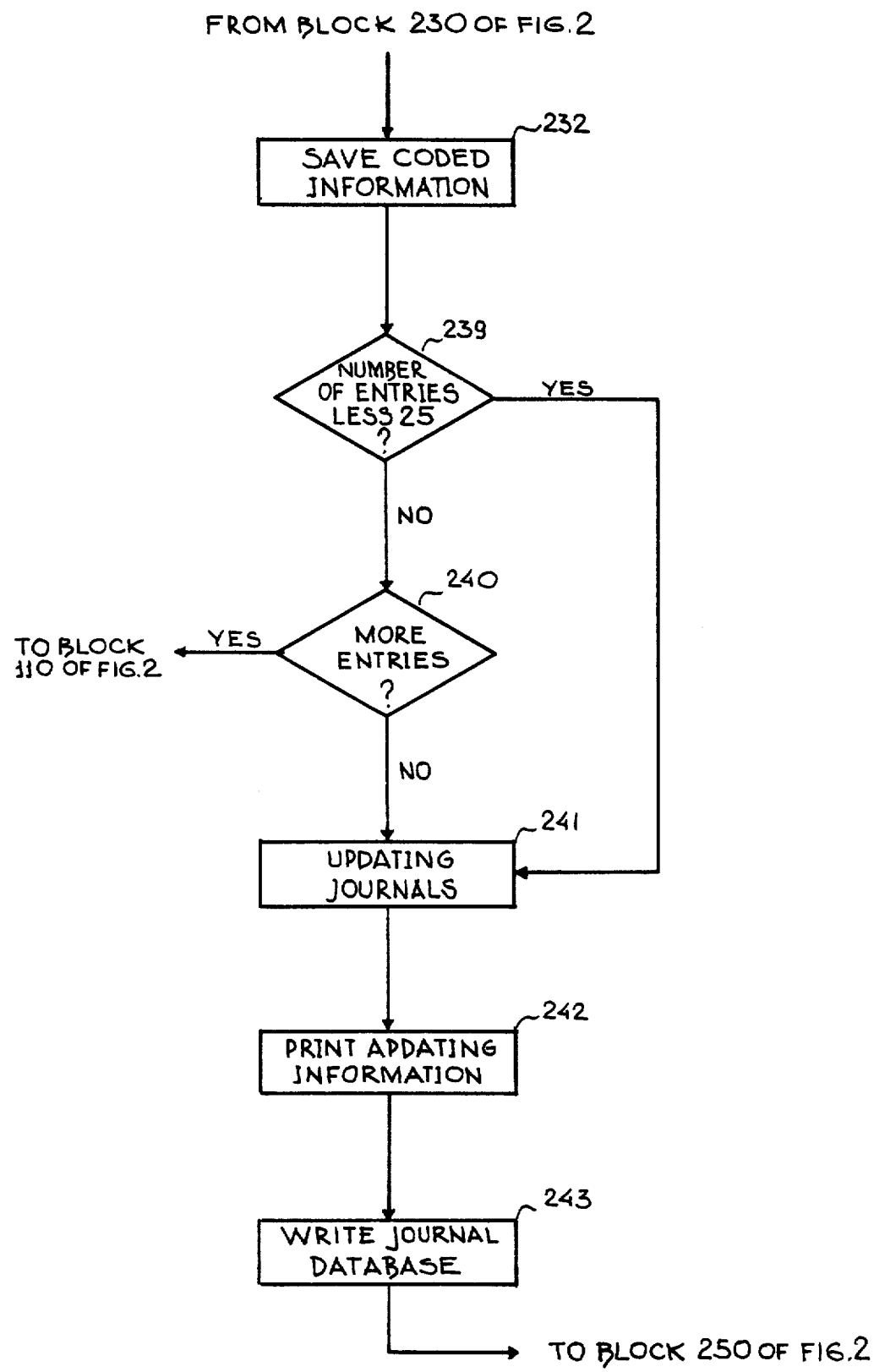
FIG. 3 is a schematic flow chart which in conjunction with a corresponding part of the flow chart of FIG. 2 represents another version of the present invention.

That completes the data processing in overview for one complete operation of the system as for updating the state of financial condition of the company. Referring now to FIG. 3, there is shown a data processing and system operational flow chart which substitutes the corresponding part of flow chart in FIG. 2 and represents another version of the invention. After step 230 of FIG. 2 where the attributes of document of financial transactions have been arranged to form a collection of coded data, which is immediately printed out for verification, this collection is retained in the operating memory of the machine (block 232 of FIG. 3) rather than stored on magnetic tape and removed from operating memory as happened in block 231 of FIG. 2. If there are more entries ("yes" answer on verification test of block 240) each new document adds another collection of coded attributes to the previous collection creating a database in block 232. If there is no more entries or the number of entries reaches 25 (block 239) the database is searched for information to update accounting journals (block 241), the updating information is then printed out in block 242 and the database is stored on magnetic tape and also on any other available information storage means (functional block 243). In this version of the invention the number of entries in block 239 is limited not only by the reasonable time and effort to re-enter information in case it was lost, but also by the size of operating memory available to store database of attributes of documents of business transactions. All steps subsequent to 243 in the flow chart of FIG. 3 do no differ from those of FIG. 2.

Figure 4:
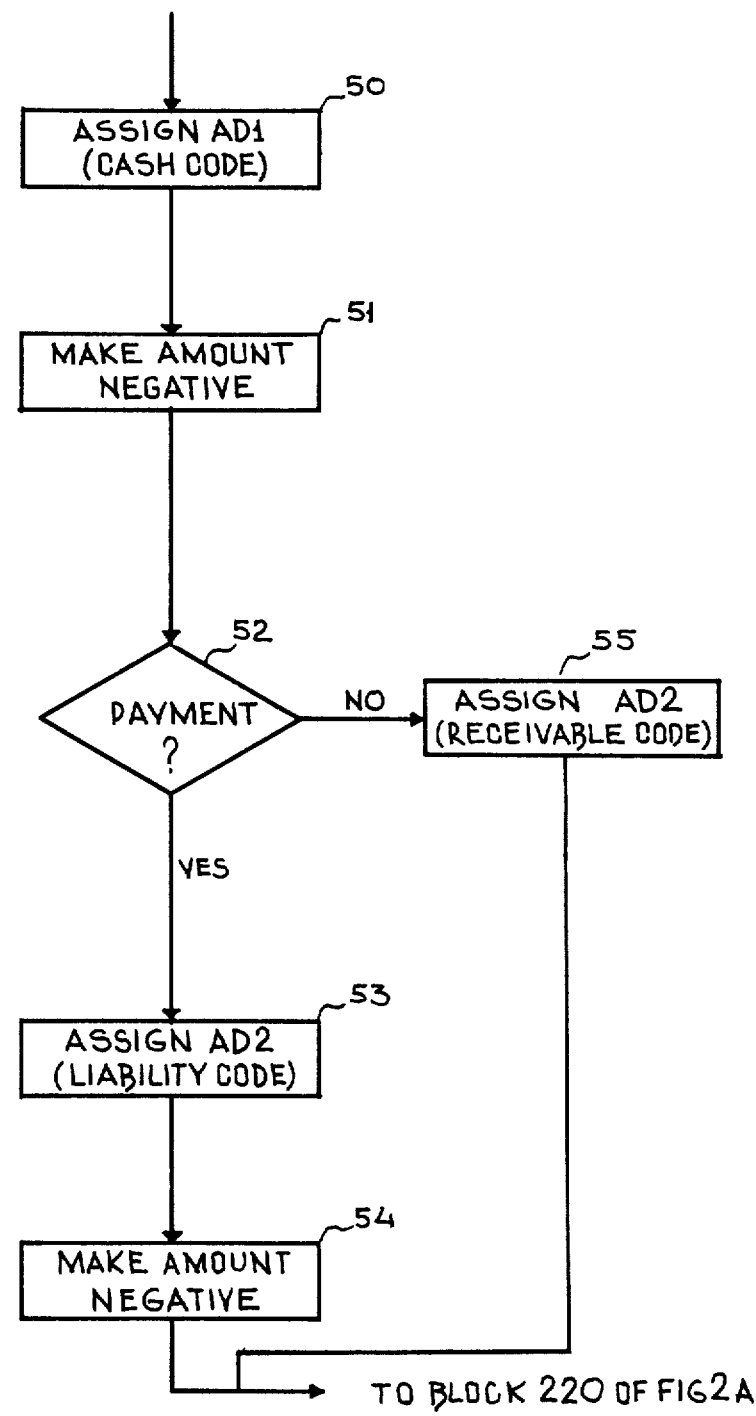
FIG. 4 is a flow chart depicting data processing of business documents in functional blocks 140, 160, 180 and 200 of FIG. 2.

Referring now to FIG. 4, there is shown a detailed flow chart for processing documents of financial transactions corresponding to functional block 140 of composite in FIG. 2. The structure of blocks 160, 180 and 200 is similar to the structure of block 140. The idea of block 140 is to assign addresses AD1 and AD2 of two business accounts to the monetary amount AM of a check according to the following philosophy of handling a particular business transaction. In case of an own check the first address AD1 is always known—it is cash account which is immediately affected whenever own check is issued. Consequently the first step comprises an automatic assigning of cash account code AD1 to the amount of check (block 50). At the next step (block 51), this amount is made negative (AM1), because issuing the own check always implies diminishing the cash account. In order to assign the second address AD2 additional information should be entered indicating whether the check was issued as a payment of invoices or as a loan to somebody (verification block 52). In case of payment (answer "yes" to test 52) liability account should be affected, i.e., the code of liability account should be assigned as a second address (block 53). Since the total of liability account will in this case diminish, the amount AM2 addressed to this account should be made negative (block 54). If the answer to test 52 is "no", i.e., check is issued as a loan to somebody, return of this money in future is contemplated and accounts receivable should be affected. This means that the second address AD2 should be the code of account receivable (block 55). Since the total of this account will in this case increase, the amount AM2 addressed to this account should be positive.

That completes the data processing within the scope of functional block 140. All other similar functional blocks, like blocks 160, 180, and 200 differ from block 140 only by the codes of two accounts which are assigned to the amount of the document of business transaction reflecting the philosophy of how this transaction affects accounts. For instance, the processing of checks from others first of all affects cash account and accounts receivable (if it is payment) or liability account (if it is loan), (functional block 160). Processing own invoice would affect accounts receivable and revenue account (block 180). Processing invoice from others would affect liability account and expense or fixed asset account (block 200).

Functional blocks 140, 160, 180 and 200 are immediately followed by file updating procedure (block 220) during which the total TOT (AD1) of a business account having code AD1 is changed by the amount AM1 (positive or negative):

$$TOT1 = TOT(AD1) + AM1, \quad (1)$$

where TOT1 is the updated total of the collection of coded data. Similarly, the total TOT (AD2) of a business account having code AD2 is changed by the amount AM2:

$$TOT2 = TOT(AD2) + AM2, \quad (2)$$

where TOT2 is another updated total of the collection of coded data.

Computations for balance sheet performed in functional block 250 of composite FIG. 2 comprise calculation of total assets (TOTAST) and owner's equities (OWNEQ):

$$TOTAST = CASH + CURAST + FIXAST \quad (3)$$

$$OWNEQ = CAP + REV - TOTEXP \quad (4)$$

where TOTEXP is a total expense representing the sum of all expense accounts of updated collection of coded data, REV—total of revenue account, CASH—total of cash account, CURAST—total of current assets, FIXAST—total of fixed assets.

There is no need to calculate total liabilities and owner's equities since they automatically are equal to total assets because the collection of coded data is always balanced.

In order to arrive at income statement a file subtraction is performed in block 270 using a simple algorithm:

$$TOT3(K) = TOT2(K) - TOT1(K) \quad (5)$$

where K changes from 1 to 28; TOT1(K)—initial collection of coded data; TOT2(K)—updated collection; TOT3(K)—differential collection.

Figure 5:
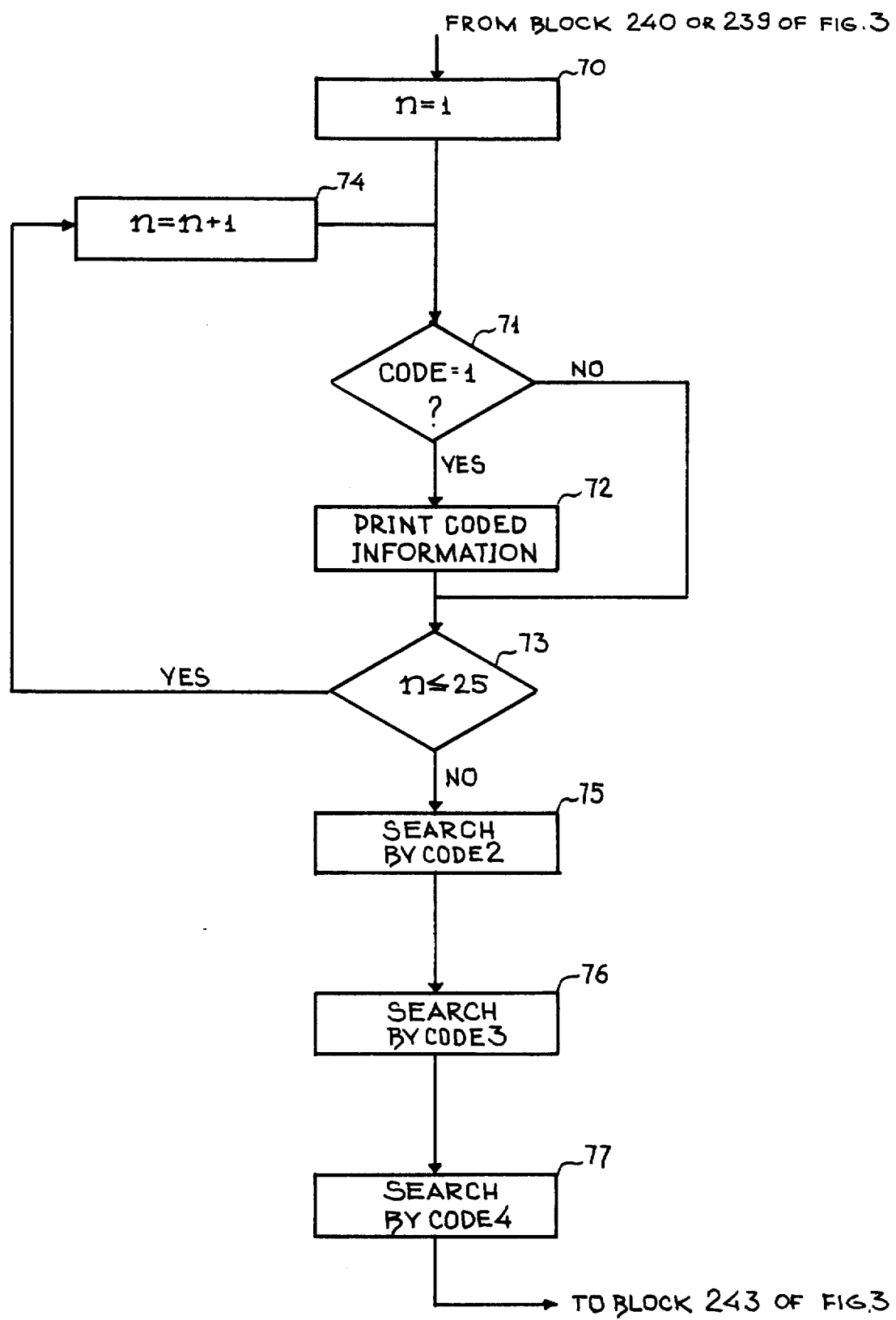
FIG. 5 is a flow chart illustrating search for information to update accounting journals in functional blocks 241 and 242 of FIG. 3.

Referring now to FIG. 5 there is shown a detailed flow chart for searching the database for obtaining information in order to update accounting journals corresponding to functional blocks 241 and 242 of FIG. 3. The data processing starts with the first (n=1) collection of coded attributes of documents of business transactions (block 70). Test 71 verifies whether the examined collection belongs to business' check (own check—code 1). If test 71 is satisfied ("yes" output) the collection is printed out (block 72). If test 71 fails ("no" output) the search is switched to the next collection if there is any more in the database (test 73). As a result all collections belonging to own checks are printed out supplying information for updating cash disbursement journal. The data process then is switched to a search by code 2 which corresponds to check from others. The process of search by this code is essentially the same as by code 1, comprising the same operations from 70 to 74 except that the code number is 2 (block 75). As a result of this search a printed report is prepared to update cash receipts journal. In the similar way the search is performed by code 3 (block 76) corresponding to own invoice, providing therefore information for updating sales journal, and by code 4 (block 77) corresponding to invoice from others providing information for updating purchasing journal.

Figure 6:
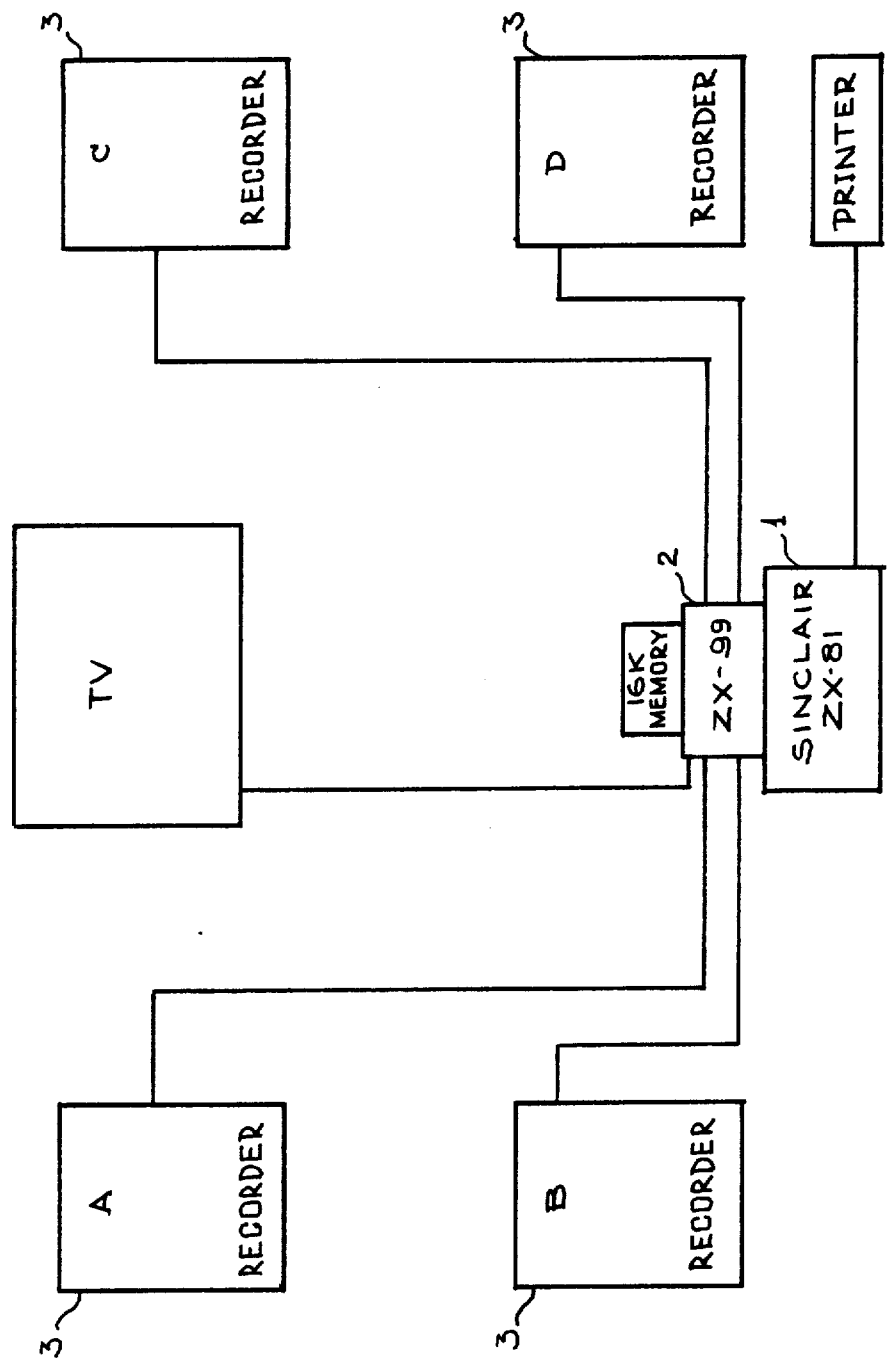
FIG. 6 is a diagrammatic representation of a preferred embodiment of a bookkeeping and accounting system based on Sinclair computer ZX81.

Referring now to FIG. 6, there are shown schematically elements of one preferred embodiment of the invented bookkeeping and accounting system based on Sinclair computer (a Z-80 microprocessor based product of Sinclair Research Company from United Kingdom). In this figure, 1 is the Sinclair computer ZX81; 2—tape control system ZX99, which controls four portable tape recorders 3; 4—16 kilobyte random excess memory pack for Sinclair computer; 5—32 character per line printer for Sinclair computer; 6—TV set. Two tape recorders A and B are used for loading. More specifically any one of recorders A and B may be used to load the program into the computer, this program being based on the flow chart described above. The recorder A may be used then to load the initial file, and recorder B—to load the reference file. Recorders C and D are used to save information on magnetic tape: recorder C saves the updated file, recorder D saves coded attributes of business documents immediately after they have been processed by the central processing unit, building a database for subsequent updating business journals. Reading and writing files as well as starting and halting the tape recorders is performed with the help of a separate tape-control system 2. Most portable tape recorders can be used in this system, provided they have tone and volume controls, a counter and remote control. The advantage of this embodiment of the invented accounting system is its very low cost (much less than 500 U.S. dollars) and reliable information backup since every transaction is individually printed out on the printer and saved on magnetic tape. Any other low priced computers having memory as low as 16 kilobyte or more, like Commodore TM, Radio Shack TRS-80 computer and others can be used to implement the invented bookkeeping and accounting system. An additional memory in excess of 16 kilobyte is not essential for generating financial statements and creating database for updating accounting journals.

What is claimed is:

1. A method for providing bookkeeping and accounting, the method comprising the steps of
   (a) entering into a processing unit a collection of coded numerical data of monetary totals of business accounts, said collection being called starting collection and reflecting financial condition of a business as of a particular day, called starting day, all the data of said collection being balanced so that the total of all asset accounts are equal to the total of all equity accounts;
   (b) entering into said processing unit a monetary amount and a code of each document of new business transactions (checks, invoices, etc.) which have not been already reflected in said starting collection of coded numerical data;
   (c) adding said monetary amount to the totals of at least two business accounts, the codes of said accounts corresponding to the code of the entered document so that the total of all asset accounts remain equal to the total of all equity accounts, whereby a new collection of coded numerical data is being created, said collection called updated collection and describing financial condition of a business on the day when the documents of financial transactions have been entered, said day being called ending day;
   (d) combining and arranging the data of said updated collection to provide a statement of financial condition on the ending day;
   (e) printing out said statement of financial condition with the help of an output device;
   (f) saving said updated collection of coded numerical data on magnetic tape and also on other available information storage means with the help of an output device for permanent storage.

2. A method of claim 1, further comprising the steps of
   (g) subtracting the starting collection of coded data from the updated collection in the way that each datum of initial collection with a particular code is subtracted from the datum of the updated collection with the same code, whereby a new differential collection of coded data is created;
   (h) combining and arranging the data of differential collection to provide income statement for the period from the starting day to the ending day;
   (i) printing out said income statement with the help of an output device.

3. A method of claim 2 further comprising the steps of
   (j) entering other attributes of each new document of financial transaction, besides the monetary account and the code of said document into said processing unit, said other attributes including date, number, issuer name;
   (k) said unit arranging all attributes of said document into collection of coded data;
   (l) printing out said collection of coded data for verification and storage;
   (m) saving said collection on magnetic tape and also on other available information storage means for permanent storage, whereby a database of documents of business transactions is created in order to subsequently update accounting journals.

4. A method of claim 2, further comprising the steps of
   (j) entering other attributes of each new document of financial transaction, besides the monetary amount and the code of said document into said processing unit, said other attributes including data, number, issuer name;
   (k) arranging by said processing unit all attributes of the document of financial transaction into collection of coded data;
   (l) printing out said collection of coded data for verification and storage;
   (m) memorizing said collection of coded data in said processing unit, whereby a database is being created in case several documents of financial transactions are being entered to update the initial file;
   (n) performing a search of said database to find documents belonging to particular accounting journals;
   (o) providing a printout of documents of financial transactions belonging to particular journals in order to update said journals;
   (p) storing said database on magnetic tape and also on other available information storage means.

5. The method of claim 1 further comprising the steps of
   (g) entering a reference collection of coded data into the processing unit, said reference collection describing financial condition of a business on a reference day which precedes the ending day;

(h) subtracting the reference collection from the updated collection in the way, that each datum of the reference collection with a particular code is subtracted from the datum of the updated collection having the same code;

(i) creating via said subtraction a differential collection of coded data;

(j) combining and arranging the data of differential collection to provide income statement for the period from the reference day to the day of entering new documents of financial transactions;

(k) printing out said income statement with the help of an output device.

6. A method for providing financial statements, the method comprising the steps of (a) entering into a processing unit two collections of coded data of monetary totals of business accounts reflecting financial condition of a business on two different days, on a later day, which is called the ending day, and on an earlier day, which is called the reference day, all data of each of said collections being balanced so that the total of all asset accounts of each collection is equal to the total of all equity accounts of the same collection;

(b) combining and arranging the data of the collection corresponding to the ending day to generate a statement of financial condition (balance sheet) on the ending date;

(c) printing out the statement of financial condition (balance sheet) on the ending day with the help of an output device;

(d) subtracting the data of said collection, which corresponds to the reference day, from the data of said collection, which corresponds to the ending day, so that each coded datum of one collection is subtracted from the datum of another collection having the same code;

(e) creating via said subtraction a differential collection of coded data;

(f) combining and arranging the data of said differential collection to generate a statement of profits and losses (income statement) for the period from the reference day to the ending day;

(g) printing out said income statement with the help of the output device.

* * * * *